INVENTOR
W. R. BENNETT, JR.
ATTORNEY

United States Patent Office 3,170,122
Patented Feb. 16, 1965

3,170,122
FREQUENCY STABILIZED OPTICAL MASER
William R. Bennett, Jr., Berkeley Heights, N.J., assignor to Bell Telephone Laboratories, Incorporated, New York, N.Y., a corporation of New York
Filed Oct. 30, 1961, Ser. No. 148,338
6 Claims. (Cl. 331—94.5)

This invention relates to optical masers and more particularly to optical masers adapted to produce a stable output frequency.

The recent development of optical masers has made possible for the first time the generation and amplification of coherent and highly monochromatic electromagnetic wave energy in the optical frequency range. The optical portion of the electromagnetic spectrum is considered to extend from the farthest infrared to beyond the ultraviolet. Masers operable in this frequency range typically comprise an optical cavity resonator in which there is disposed an appropriate negative temperature medium. Devices of this type, employing a cavity resonator formed by a pair of spaced parallel reflective plates, are disclosed in United States Patent 2,929,922 to Schawlow and Townes. Optical cavity resonators of other types are disclosed in copending United States patent application Serial No. 61,205, filed October 7, 1960, by Boyd, Fox and Li, issued September 25, 1962 as United States Patent No. 3,055,257, and in copending application Serial No. 136,910, filed September 8, 1961, by J. R. Pierce, issued June 16, 1964 as United States Patent No. 3,137,-827 and assigned to the assignee herein.

As a practical matter, the dimensions of the above-described resonators are on the order of several thousand times as large as the wavelengths generated by the optical maser. Hence, such resonators are inherently multimode devices. An analysis of the mode system of the parallel plate resonator, for example, may be found in an article by Fox and Li in the Bell System Technical Journal, vol. 40, page 453. It can be seen from the analysis set forth therein that the resonator is capable of supporting a plurality of modes at distinct but closely spaced optical frequencies. Furthermore, as the frequencies of the resonant modes are strongly dependent on the dimensions of the cavity, the maser output is subject to frequency variations resulting from mechanical and thermal as well as other environmental changes.

Among a greater number of actual and potential application of the optical maser, however, are those which make use of the unique bandwidth and frequency characteristics of its output. More particularly, in many of these applications it is considered highly desirable that the maser output frequency have maximum stability. A frequency stabilized optical maser, for example, is capable of providing a convenient optical frequency standard of extremely great accuracy. This is so because the line width of the maser output is typically considerably less than the width of the corresponding spectral line of the active maser medium. The output of such a device may also provide a standard of length based on optical wavelengths and characterized by a degree of precision hitherto unattainable. Although these applications are but examples, it may be said, in general, that the ultimate usefulness of the optical maser as a research tool and as a communication device is influenced by the frequency stability that may be obtained.

Accordingly, it is an object of this invention to stabilize the output frequency of an optical maser.

It is also an object of the invention to control the deviation of the output frequency of an optical maser with respect to an optical frequency determined by the characteristics of the active maser medium.

This invention depends upon the fact that, under certain conditions, an optical maser may be caused to oscillate simultaneously in several different modes at different frequencies. More particularly, the invention is based on my discovery that these frequencies are so related to each other that the beats between selected modes may be used to generate a difference or error frequency which is a measure of the departure of a given mode from a certain reference frequency. The reference, which is substantially constant, is determined by the characteristics of the active maser medium.

The objects of the invention are achieved in a specific illustrative embodiment thereof comprising an elongated optical cavity resonator having flat parallel reflective end members and containing a negative temperature medium. The separation of the reflective end members is determined by at least one elongated spacer member which may advantageously comprise a magnetostrictive material. A control coil encircles the magnetostrictive spacer member, the length of which may then be varied by means of the magnetic field generated by control currents flowing through the coil. Control voltages are applied to the coil by means responsive to changes in the frequency components of the maser output.

It is a feature of the invention that the active maser medium is characterized by an inhomogeneously broadened emission line. That is, the gain produced by stimulated emission at a given frequency is largely independent of the gain produced at other frequencies within the line width. Inhomogeneous broadening of the atomic or molecular resonance line, primarily a result of the Doppler effect, makes possible simultaneous oscillation in a plurality of resonant cavity modes which are relatively closely spaced over the line width. I have discovered that the presence of certain nonlinearities in inhomogeneously broadened maser media causes oscillation to occur at frequencies slightly removed from the center frequencies of the cavity modes. More particularly, I have found that the frequencies of the oscillating modes are pulled towards the center frequency of the broadened emission line, and that the amount of pulling is a nonlinear function of the separation of the mode frequency from the center frequency of the line. An exemplary inhomogeneously broadened medium is a mixture of helium and neon.

It is a further feature of the invention that the output frequency of an optical maser is controlled by varying the optical length of the associated cavity resonator in response to changes in the frequency difference between selected resonant modes therein.

The above-mentioned and other objects and features of the invention will be better understood from the following more detailed discussion taken in conjunction with the accompanying drawing in which.

Figure 1A:
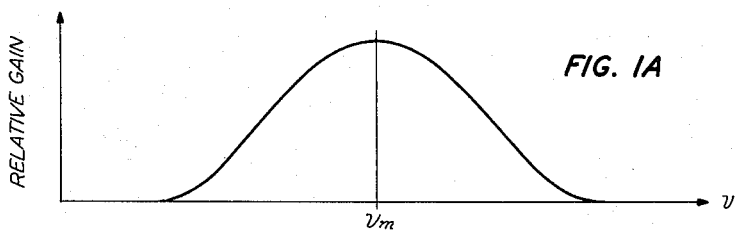
FIGS. 1A, 1B, 1C, 1D and 1E shows the relation, under various conditions, between the gain produced by a single passage of a signal wave through a maser medium, and optical frequency.
Figure 1B:
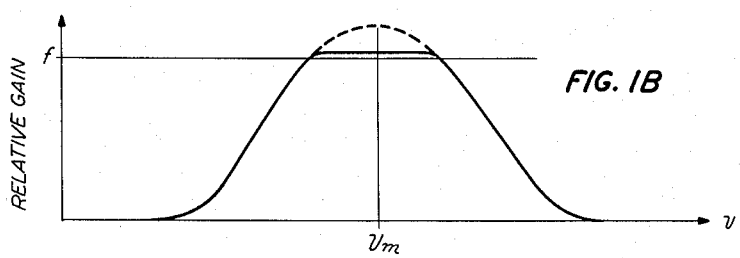

Referring now to the drawing, there is shown in FIG. 1A a plot of the relative gain produced on each passage of a signal wave through an active maser medium, versus frequency. The center frequency of the Doppler broadened line is indicated by $\nu_m$, while the threshold for maser oscillation in a cavity resonator is indicated by $f$. In order for maser oscillation to begin in a cavity, it is necessary to apply to the medium sufficient pump wave energy to increase the number of excited atomic or molecular oscillators therein to the point where the gain on each passage exceeds the losses. The density of oscillators in actual optical maser materials is such that a medium of great length would be required to produce practical amplification of the stimulating signal on a single pass therethrough. It is the practice, therefore, to position a relatively short length of the active medium in an optical cavity resonator of very high Q in order to exceed the threshold for oscillation. Typically, this implies a cavity characterized by a resonant bandwidth which is much narrower than the Doppler width of the maser transition. Hence, the frequencies at which oscillation may occur are determined primarily by the cavity resonances. With the onset of oscillation the relative gain tends to reach a stable value due to saturation of the quantum transition by which maser action is produced. In a homogeneously broadened medium reduction of gain at one frequency implies a proportionate reduction at all other frequencies. Thus, when oscillation begins at one frequency the maser transition is quickly saturated over the entire width of the homogeneously broadened emission line. Such a situation is illustrated in FIG. 1B.

Figure 1C:
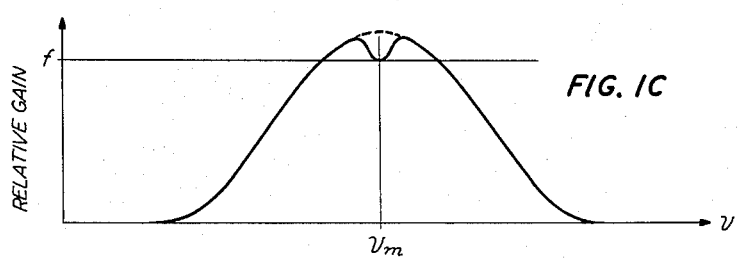

On the other hand, when an inhomogeneously broadened maser medium is disposed in a cavity resonator and the threshold is exceeded, oscillation occurs at a frequency corresponding to a cavity resonance with a negligible effect on the number of excited oscillators at frequencies outside this narrow line. Thus, saturation of the maser transition occurs only in narrow portion of the broadened line, while the relative gain at other frequencies encompassed by the Doppler line is substantially unaffected. In effect, a hole is burned in the Doppler line. FIG. 1C illustrates one such situation, in which the cavity resonance coincides with the center of the Doppler line.

As the pump energy is increased, thereby exciting a greater number of quantum oscillators to higher energy states, oscillation becomes possible over a larger portion of the Doppler width. Thus, in FIG. 1D oscillation occurs in two additional cavity modes which have resonant frequencies $\nu_2$ and $\nu_3$ close to that of the principal mode at $\nu_m$. For the Fabry-Perot types of optical cavity resonator the frequencies of the resonant modes are determined by requiring that the distance L between the reflective end surfaces be a half-integral multiple of the wavelength. These are referred to as the even-symmetric radial modes and differ in frequency by $c/2L$ where $c$ is the velocity of light. The spectrum of the maser output thus includes the frequencies corresponding to the various cavity modes, as well as the various beat or difference frequencies. Beats resulting from the simultaneous oscillation of odd- and even-symmetric radial modes are also present. These, however, are strongly dependent on the alignment of the reflective ends of the cavity. For this reason they are both easily identifiable and not well suited for use in the invention. The discussion which follows is, therefore, concerned principally with the even-symmetric modes and the frequency differences between them.

Figure 1D:
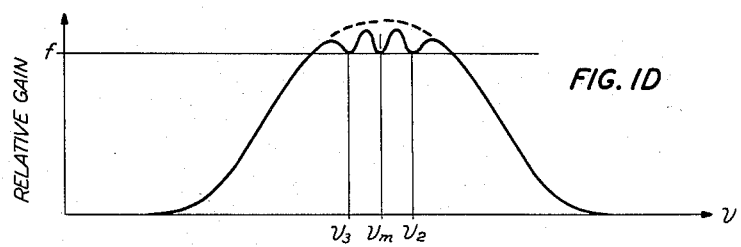

It is to be noted that the resonant modes at $\nu_3$ and $\nu_2$ in FIG. 1D are symmetric about the center of the Doppler line at $\nu_m$. Although in an empty cavity these modes would be separated by $c/2L$, the separation has been found by experiment to be somewhat less in an actual maser. This effect may be explained as resulting from a pulling of the resonant frequencies toward the center of the Doppler line. Furthermore, I have discovered that the pulling effect is a nonlinear function of the separation between a given mode and the center of the Doppler line. More particularly, the pulling effect increases as the separation of the mode from the Doppler center increases.

The oscillation frequency of an optical maser is determined primarily by conditions on the phase of the electric field of the signal wave in the cavity resonator. The phase shifts of most importance to this invention arise from time delays which occur on each passage of the signal through the cavity. For a standing wave to build up therein, the single pass phase shift must be an integral multiple of $\pi$. Hence, the evacuated cavity, in which the refractive index $n$ is equal to 1, has resonant frequencies separated by $c/2L$. The introduction of an active maser medium into the cavity changes the refractive index of the system, thereby altering the single pass phase shift. Oscillation therefore occurs at another frequency $\nu$, differing from the cavity resonance $\nu_{oc}$ by an amount such that the single pass phase shift is still an integral multiple of $\pi$.

The phase shift of a wave which travels once through an interferometer of length L at a phase velocity $c/n$ is (1) $$\Phi = \frac{2\pi \nu L n}{c}$$

The dispersion $$\frac{\partial \Phi_c}{\partial \nu}$$

for the evacuated cavity is constant. It is convenient to express $$\frac{\partial \Phi_c}{\partial \nu}$$

in terms of $f$, the fractional energy loss per pass, and $\Delta \nu_{oc}$, the full width of the cavity resonance at half-maximum intensity:

(2) $$\frac{\partial \Phi_c}{\partial \nu} = \frac{f}{\Delta \nu_{oc}}$$

There will, in general, be some negligible contribution to the dispersion arising from the resonant nature of the mirror reflection coefficient. This factor has no important effect on the absolute frequency of the oscillation and may, therefore, be ignored.

Since the cavity dispersion is large compared to that of the active medium, oscillation occurs at a frequency close to $\nu_{oc}$ and the pulling is small. More particularly, the maser oscillates at a frequency $\bar{\nu}$ such that (3) $$\frac{\partial \Phi_c}{\partial \nu} (\bar{\nu} - \bar{\nu}_{oc}) + \Delta \Phi_m(\bar{\nu}) = 0$$

where $\Delta \Phi_m(\bar{\nu})$ is the total change in single pass phase shift at the actual frequency of oscillation due to insertion of the active medium. From Equation 1

(4) $$\Delta \Phi_m(\bar{\nu}) = \frac{2\pi L}{c} \left[ (n_o - 1) + (n - 1) \right] \bar{\nu}$$
$$= \frac{2\pi L}{c} (n_o - 1) \bar{\nu} + \Delta \Phi_m(\nu)$$

The first term in Equation 4 is dependent on the density of ground state atoms in the maser and from the density of excited atoms which may participate in neighboring transitions. That is, this term arises from a refractive index which is essentially independent of frequency over the range of interest. From the above we may write (5) $$\bar{\nu}_c = \nu_c - \frac{\Delta \nu_c}{f} \Delta \Phi_m(\bar{\nu})$$

where $$\bar{\nu} = \frac{\nu_{oc}}{n_o} \text{ and } \Delta \nu_c = \frac{\Delta \nu_{oc}}{n_o}$$

The term $\Delta \Phi_m(\bar{\nu})$ is a function of the fractional energy gain per passage through the active medium, $g(\bar{\nu})$. The gain is a nonlinear function of frequency over the Doppler broadened width of the maser transition. Thus, $\Delta \Phi_m(\bar{\nu})$ is also a function of frequency which, generally, is zero at the line center $\nu_m$, is negative for frequencies less than $\nu_m$ and positive for greater frequencies. This is the familiar phenomenon of anomalous dispersion. It follows from the evaluation of the single pass phase shift in inhomogeneously broadened media that a nonlinear frequency dependent pulling term is also present in the actual oscillation frequencies of the optical maser. Such an effect is not found in homogeneously broadened media, and its presence in the inhomogeneously broadened case is a result of the hole-burning phenomenon.

In accordance with my invention, the nonlinearity of the mode pulling effect is made the basis of a system which measures the deviation of a principal cavity mode from the center of the Doppler broadened line of the active medium. Although the width of the Doppler line varies with temperature and pressure, its center is substantially unaffected by such environmental conditions. Thus, the information derived in this manner may be used to vary appropriate maser parameters, thereby accurately controlling the output frequency in a desired manner.

Figure 1E:
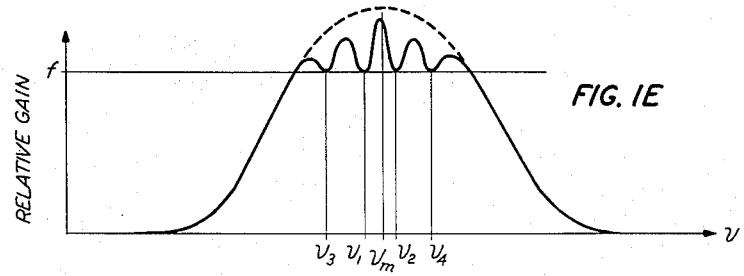

FIG. 1E indicates the relative frequencies of the oscillating modes in an optical maser when the principal cavity resonance differs from $\nu_m$. The pulling effects on the modes oscillating at $\nu_3$ and $\nu_2$ are not symmetrical, as they are in FIG. 1D. In addition, the $\nu_1$ mode, which no longer coincides with $\nu_m$, is itself subject to pulling. In general, the pulling increases nonlinearly with the distance of $\nu_1$ from $\nu_m$ thereby producing an asymmetric distribution of modes about $\nu_m$. The net effect is that the separation between $\nu_3$ and $\nu_1$ differs from the separation between $\nu_1$ and $\nu_2$. Thus the deviation of $\nu_1$ from $\nu_m$ may be measured by beating $\nu_3$ with $\nu_1$ and $\nu_2$ with $\nu_1$ and extracting the difference frequency of the two beats. The difference frequency is zero when $\nu_1$ and $\nu_m$ are coincident, and increases with the separation between them. It should be noted that a particular maser may display a residual difference frequency when $\nu_1$ coincides with $\nu_m$. This is believed to be due to variations in the mirror reflection coefficients for different polarizations. Stabilization of the central cavity mode at the center of the Doppler line is then achieved by minimizing the difference frequency. Similarly, the central cavity mode may be stabilized at a frequency distinct from the center of the Doppler line, by stabilizing the difference frequency at some convenient value.

Figure 2:
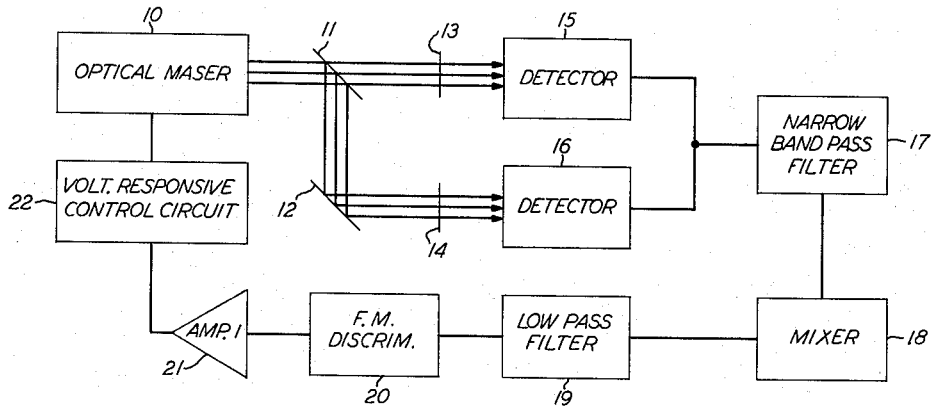
FIG. 2 depicts, in schematic form, a system for stabilizing the output frequency of an optical maser in accordance with the invention.

An illustrative embodiment of the invention is shown in schematic form in FIG. 2. An optical maser 10 having an active medium characterized by an inhomogeneously broadened Doppler line such as is provided by the helium-neon gas system produces an output beam which is to be stabilized. A portion of the output sufficient for control purposes is directed at a semitransparent mirror 11. Part of the beam incident on mirror 11 is transmitted, passing through a polarizer 13 to detector 15. The portion of the beam reflected by mirror 11 is directed by a mirror 12 through a polarizer 14 to a detector 16. For reasons to be explained below, polarizers 13 and 14 are oriented so that they pass components of the maser beam which are polarized at right angles to each other.

The detectors 15 and 16 are of a type adapted to detect beat frequencies between adjacent cavity modes. A photomultiplier tube, for example, of the 7102 type is well suited for use with optical masers such as the above-mentioned helium-neon optical maser. Such tubes are basically square law detectors and will not respond to the beat between two modes which are polarized linearly at right angles. As the polarization of the modes in the optical maser are likely to be somewhat random, it is deemed advisable to split the output beam, as is done by mirrors 11 and 12, and to pass the separate portion through polarizers oriented at right angles to each other. In this way, it is insured that at least a portion of the output beam will produce beats at the detector. Alternatively, a single polarizer may be provided together with means for adjusting its orientation to produce the desired beats.

The beat frequency spectrum will include a peak at zero frequency corresponding to each line beating with itself, followed by a peak near $c/2L$ corresponding to the differences between all even- and odd-symmetric modes separated by $c/2L$. Higher order difference frequencies may also be included, depending on the amount by which the pump power exceeds the threshold value. However, as the $c/2L$ beats are likely to have the greatest amplitude, it will in most cases be desirable to utilize them in the control circuit. For this reason, the signal taken from detectors 15 and 16 is advantageously passed through a narrow band filter 17 which has a passband centered about $c/2L$. The frequency difference between the beats produced by oscillating modes at $\nu_1$ and $\nu_3$ and $\nu_1$ and $\nu_2$ is extracted by putting the signal from filter 17 through mixer 18. A low pass filter 19 serves to remove any higher harmonics produced in mixer 18. Variations in the frequency difference between the beats are converted to voltage variations by an FM discriminator 20. An amplifier 21 provides sufficient power output to drive a control circuit 22 which tunes the maser to compensate for departures of the output from a predetermined frequency.

Figure 3:
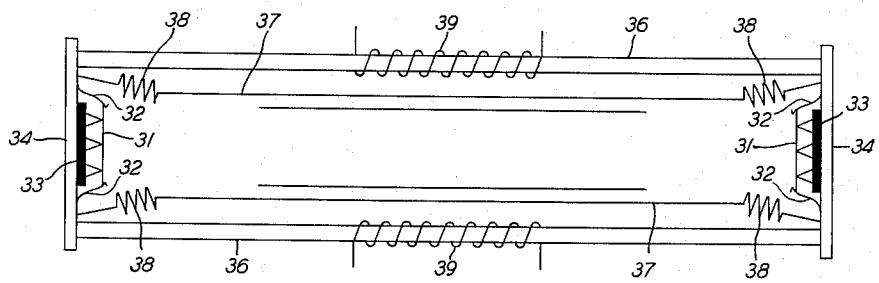
FIG. 3 depicts an optical maser illustrative of the type suitable for use in the invention.

The control circuit 22 advantageously is of a type which alters the optical length of the optical cavity resonator of the maser 10, although tuning may also be accomplished by varying one or more other appropriate parameters of the device. An illustrative tunable optical maser is depicted in FIG. 3, in which the cavity is formed by reflective plates 31 held by spring clips 32 against three-point mountings 33. At least one of the plates 31 is partially transmissive to couple the cavity to external circuitry. The mountings 33 are securely fastened to large flanges 34. The flanges 34 are surface-ground and separated by spacer-rods 36 which may be of a magnetostrictive material such as, for example, Invar. A glass tube 37 containing a gaseous maser medium, such as a mixture of helium and neon, is attached to flanges 34 by means of metal bellows 38 which are sufficiently flexible to permit the separation of the flanges to be over a small range in response to changes in the length of the rods 36 produced by control currents flowing in coils 39.

Although the invention has been described with particular reference to a specific illustrative embodiment, many variations and modifications are possible and may be made by those skilled in the art without departing from its scope and spirit. For example, the maser may be tuned by means of a cell inserted in the light path between the mirrors and containing a substance having a field controllable refractive index.

What is claimed is:

1. In combination, an optical maser comprising means forming an optical cavity resonator characterized by a plurality of resonant modes at distinct optical frequencies, an active maser medium disposed within said cavity resonator, said medium being characterized by an inhomogeneously broadened optical emission line having a width which encompasses the frequencies of a plurality of said resonant modes, pump means for causing said maser to oscillate simultaneously in at least three of said modes, the oscillation frequencies of said modes being shifted toward the center of said emission line, the amount of said shift varying with the separation of the mode frequencies from the line center so that the separation of adjacent oscillation frequencies is least near the line center and increases away from the line center, means for detecting beats between pairs of oscillating modes in said optical maser, and means responsive to the magnitude of the frequency difference between selected pairs of said beats for tuning said optical maser.

2. Apparatus for producing frequency stabilized coherent electromagnetic wave energy in the optical frequency range including an optical maser comprising means forming an optical cavity resonator characterized by a plurality of equally spaced resonant modes at distinct optical frequencies, an active maser medium disposed within said cavity resonator and characterized by an inhomogeneously broadened optical emission line having a width which encompasses the frequencies of a plurality of said resonant modes, means for pumping said optical maser to cause it to oscillate simultaneously in at least three of said modes, the oscillation frequencies of said modes being shifted toward the center of said emission line, the amount of said shift varying with the separation of the mode frequencies from the line center so that the separation of adjacent oscillation frequencies is least near the line center and increases away from the line center, means for detecting beat frequencies between the mode nearest the center of said emission line and the next adjacent modes on either side thereof, means for measuring the frequency difference between said beat frequencies, and means for tuning said optical maser, said tuning means being responsive to the departure of said frequency difference from a predetermined value.

3. Apparatus as claimed in claim 2 wherein said cavity resonator is formed by two spaced flat parallel reflective end members, and said tuning means comprises means for varying the optical length of said resonator.

4. Apparatus as claimed in claim 3 wherein said means for varying the optical length of said resonator comprises a plurality of magnetostrictive spacer members for controlling the separation of said reflective end members, control coils individually encompassing each of said spacer members, and means for applying to said coils potentials having magnitudes dependent upon the departure of said frequency difference from said predetermined value.

5. Apparatus for producing frequency stabilized coherent electromagnetic wave energy in the optical frequency range including an optical maser comprising a pair of spaced flat parallel reflective members forming an optical cavity resonator characterized by a plurality of equally spaced resonant modes at distinct optical frequencies, voltage controllable means for varying the optical length of said resonator, an active maser medium disposed within said cavity resonator and characterized by an inhomogeneously broadened optical emission line having a width which encompasses the frequencies of a plurality of said resonant modes, means for pumping said optical maser to cause it to oscillate simultaneously in at least three of said modes, the oscillation frequencies of said modes being shifted toward the center of said emission line, the amount of said shift varying with the separation of the mode frequencies from the line center so that the separation of adjacent oscillation frequencies is least near the line center and increases away from the line center, means for splitting the output beam of said optical maser into first and second spatially separated portions, means for directing said first and second beam portions through first and second polarizers, to first and second photodetectors respectively, said polarizers being adapted to pass substantially orthogonally polarized light beams whereby said photodetectors in combination respond to the beats between the modes oscillating in said maser, means for extracting the frequency difference between selected pairs of said beats, means for producing a control voltage dependent upon the magnitude of said frequency difference, and means for applying said voltage to said optical length controlling means.

6. Apparatus for producing frequency stabilized electromagnetic wave energy in the optical portion of the spectrum including an optical maser comprising means forming an optical cavity resonator characterized by a plurality of resonant modes at distinct optical frequencies, an active maser medium disposed within said cavity resonator and characterized by an inhomogeneously broadened optical emission line having a width encompassing the frequencies of a plurality of said resonant modes, means for pumping said optical maser for causing it to oscillate simultaneously in at least two of said modes, the oscillation frequencies of said modes being shifted toward the center of said emission line, the amount of said shift varying with the separation of the mode frequencies from the line center so that the separation of adjacent oscillation frequencies is least near the line center and increases away from the line center, means for detecting beats between pairs of said modes, and means for tuning said optical maser, said tuning means being responsive to the departure from a predetermined value of the frequency difference between pairs of said beats.

References Cited in the file of this patent

UNITED STATES PATENTS

| 2,312,888 | Everest | Mar. 2, 1943 |
| 3,035,492 | Blythe | May 22, 1962 |

OTHER REFERENCES

Quantum Electronics, edited by C. Townes, Columbia University Press (New York 1960), page 581.

Javan et al.: Population Inversion and Continuous Optical Maser Oscillation in a Gas Discharge Containing a He-Ne Mixture, Physical Review Letters, vol. 6, No. 3, Feb. 1, 1961, pages 106 to 110, Forrester: Journal of the Optical Society of America, vol. 51, No. 3, (March 1961), pages 253–259.

Laine: Nature, vol. 191, No. 4790, pages 795–96 (Aug. 19, 1961).